Nov. 20, 1962

R. D. BULLARD 3,064,499

POWER OPERATED TURRET

Filed Jan. 11, 1960

INVENTOR.
Robinson D Bullard

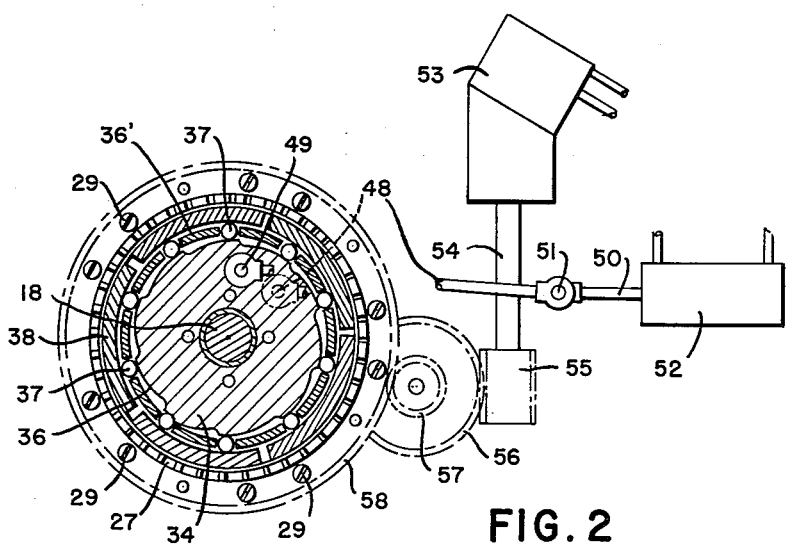
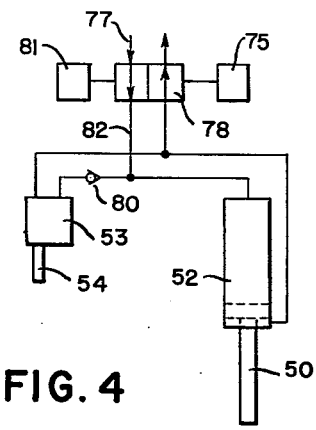
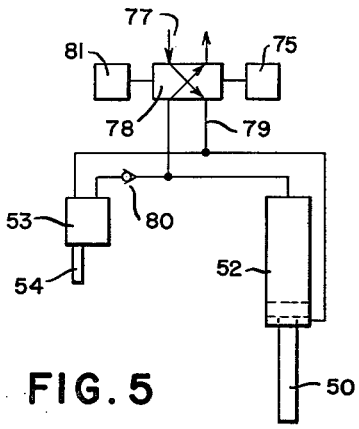
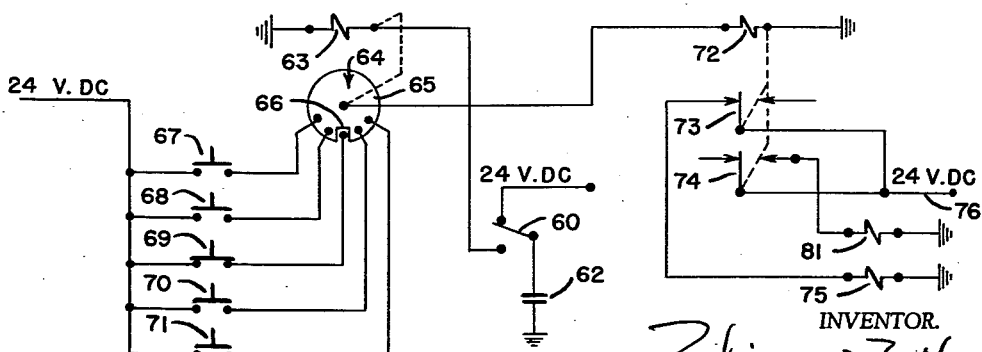

United States Patent Office 3,064,499
Patented Nov. 20, 1962

3,064,499
POWER OPERATED TURRET
Robinson D. Bullard, Springfield, Vt.
(Perkinsville Post Office, Weathersfield, Vt.)
Filed Jan. 11, 1960, Ser. No. 1,518
19 Claims. (Cl. 74—822)

The present invention relates to machine tools such as lathes and the like, and particularly to a new and improved multi-faced tool holding turret capable of being indexed from face to face and locked in accurate relation to the centerline of the work-supporting spindle.

An important object of the invention is to provide a multi-faced tool-supporting turret in which automatic centering of the axis of the tool mounting means of each face is independent of the turret supporting stud.

Another object of the invention is to provide such a turret in which the locking force is uniformly distributed over a large area at a maximum distance from the point of tool-work engagement.

Another object of the invention is to provide such a turret in which the unit locking pressure is lower than prior known turret locking devices.

Another object of the invention is to provide such a turret which can be locked at incremental locations throughout 360 degrees.

Still another object of the invention is to provide such a turret in which a maximum resistance to turning of the turret is accomplished.

Another object of the invention is to provide such a turret in which the turret locking means produces a high expanding force with minimum friction involved.

Still another object of the invention is to provide such a turret in which the stud supporting the turret is not placed in tension when the turret is locked in position.

In one aspect of the invention, a saddle of a lathe may be mounted on a cross rail for reciprocable motion, and the cross rail may be reciprocated along bed ways at right angles to the motion of the saddle, thus causing the saddle to move universally in a single plane. A stud may be fixed to the saddle, and a polygonally faced turret may be mounted on said stud for rotary motion. An annular face gear having a diameter substantially as large as the inscribed circle of the polygonally faced turret may be bolted to the saddle, the bevel teeth of which are adapted to mesh with a mating face gear fixed to the back face of the turret.

In another aspect of the invention, an oscillatable cam may be journaled on the stud and it may include peripherally arranged spiral and concentric cam surfaces adapted to act on rolls held in cooperating position on said cam surfaces by cages. Non-rotary segmental clamping shoes may be resiliently held against said rolls in such manner that upon oscillation of the cam, they will expand and contract due to the action of the cam surfaces on the oscillatable cam.

In still another aspect of the invention, the segmental clamping shoes may include peripherally arranged grooves having inclined walls forming cam surfaces adapted to mate with corresponding cam surfaces formed about the inner peripheries of the annular face gears. The construction and arrangement of these mating cam surfaces are such that when the clamping shoes are in their contracted positions, they permit a limited movement of the turret along its supporting stud sufficient to separate the teeth of the face gears so that the turret can be indexed about the stud. And, when the clamping shoes are expanded, they force the teeth of the face gears to completely mesh. Since these teeth are bevel teeth having a common cone center, the turret is automatically centered independently of the turret supporting stud.

In still another aspect of the invention, the face gear attached to the back of the turret may be provided with peripheral gear teeth adapted to mesh with a pinion rotatably driven by power operated means. An electrical circuit may be provided for energizing the power operated means when the face gear teeth are out of mesh.

The above, other objects and novel features of the invention will become apparent from the following specification and accompanying drawings which are merely exemplary.

In the drawings:

FIG. 2 is a sectional view taken substantially along line 2—2 of FIG. 1; and

FIGS. 3, 4 and 5 are schematic diagrams for the power operated locking, unlocking and indexing means.

Figure 1:
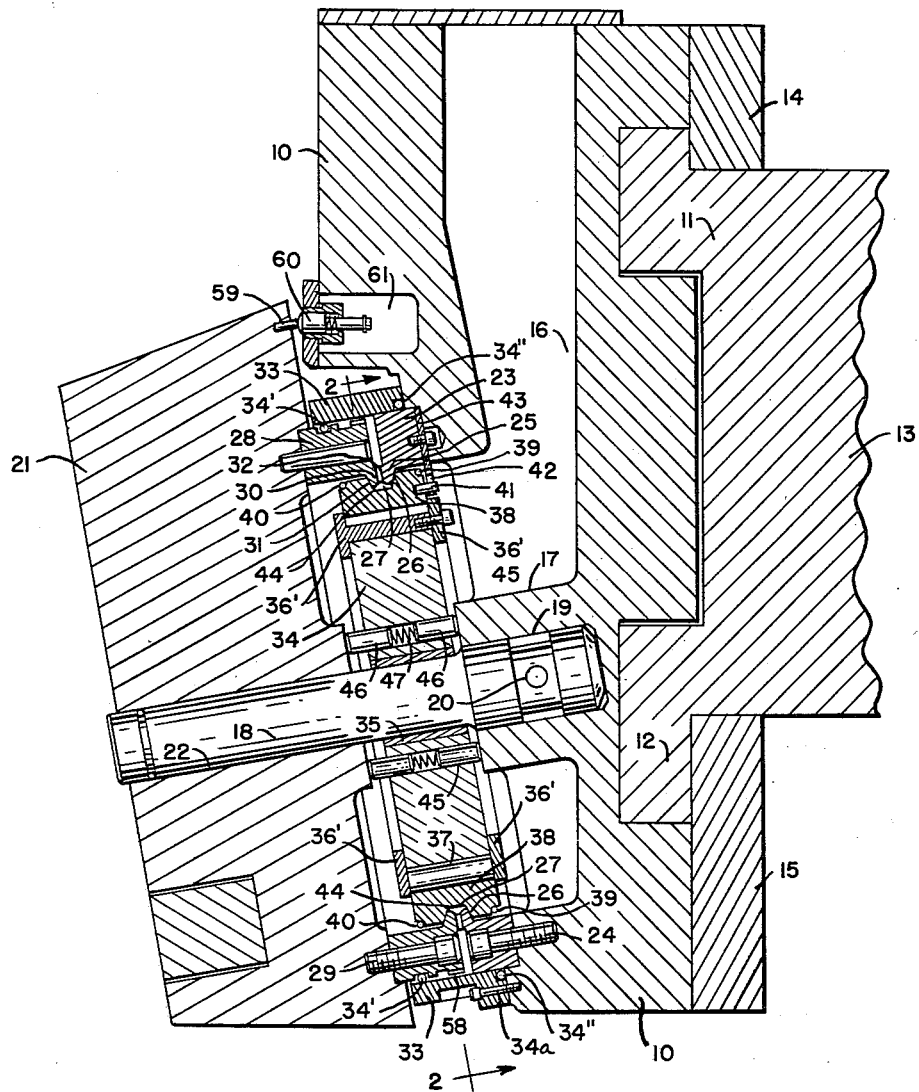
FIG. 1 is a sectional elevational view through a lathe turret to which the principles of the invention have been applied.

Referring to the drawings, and particularly to FIG. 1, the principles of the invention are shown as applied to a portion of a machine tool including a saddle 10 that is mounted on horizontally disposed ways 11 and 12 of a cross rail 13 by straps 14 and 15 bolted or otherwise fastened to the saddle 10. The cross rail 13 may be mounted for sliding motion along ways of a bed (not shown) of the machine tool, which ways are at right angles to the horizontal ways 11 and 12. The saddle 10 may be cored out at 16, forming an oil reservoir for maintaining the working parts of the turret immersed in oil. A boss 17 may be formed on the saddle 10 within the recess 16, and it may have a stud 18 pressed into a bore 19 of the boss 17. A pin 20 may also extend through the boss 17 and the stud 18 to further ensure a rigid connection between the stud 18 and the boss 17.

A polygonal-faced tool supporting turret 21 may be mounted on the stud 18 for rotary motion, and the bearing 22 between the two is preferably loose for a purpose to be described later. An annular face gear 23 may be fixed to the outer face of the saddle 10 by bolts 24. It may have a diameter as large as possible, and preferably substantially equal to that of the inscribed circle of the polygonal-faced turret 21. The gear 23 may be provided with an internally extending flange 25, on the one side of which a tapered cam surface 26 may be provided, and on the opposite side may be formed bevel gear teeth 27.

A mating annular face gear 28 may be bolted to the back face of the turret 21 by bolts 29, and it may include a flange 30 having a tapered surface 31 on one side and bevel teeth 32 on the opposite side. The gears 23 and 28 may be surrounded by a housing ring 33 bolted to the saddle 10 by cap screws 34a. O-ring seals 34' and 34" may be provided between the ring 33 and the gears 23 and 28 to prevent oil from reservoir 16 leaking past the gears 23 and 28.

A cam 34 may include a sleeve 35 that is journaled on the stud 18. Referring to FIG. 2, the cam 34 may be provided with peripherally arranged contour surfaces 36. In the embodiment described, there are ten such surfaces of 36° extent. The major portion of these surfaces 36 is somewhat spiral in nature, with an extreme end portion of cylindrical form. A roller 37 may be provided for each of the contour surfaces 36, and held in place by cages 36' on each side of cam 34. Segmental clamp shoes 38 may be supported by two rolls 37. The segmental clamp shoes may be held in cooperating position with their corresponding rolls 37, by endless coiled springs 39 and 40 lying in grooves on each side of the shoes 38. In order to prevent rotation of the shoes 38, each shoe may include a pin 41 that is received within a recess 42 in a plate 43 fixed to the back face of face gear 23. There is, of course, such a plate 43 for each segmental shoe 38.

Each shoe 38 may be provided with a centrally disposed peripheral groove 44 having tapered cam surfaces that mate with cam surfaces 26 and 31 on the flanges 25 and 30 of the face gears 23 and 28, respectively. The construction and arrangement of the parts are such that when the rolls 37 are in their radially innermost positions on contour surfaces 36 of cam 34, the springs 39 and 40 will contract the segmental shoes inwardly and peripherally toward each other so that a clearance between the walls of the grooves 44 and the flanges 25 and 30 will occur. This clearance will be sufficient to permit the intermeshing bevel face gear teeth on face gears 23 and 28 to separate and clear each other, although the grooves 44 will still lie in a position to prevent any more separation of gears 23 and 28 than is necessary to provide such clearance.

In order to effect separation of the gears 23 and 28, the cam 34 may include a plurality of through passages 45 within which pistons 46 may be located, and between which pistons 46 springs 47 may be arranged. One of the pistons 46 in each passage 45 acts against the boss 17 of saddle 10, while the other acts against the back face of the turret 21.

From the foregoing it is evident that the partial turning of the cam 34 in one direction will cause the rolls 37 to move radially inwardly on the contour surfaces 36 of cam 34, thereby providing a clearance between grooves 44 and flanges 25 and 30. This clearance will be immediately taken up by pistons 46 forcing turret 21 along stud 18 until the bevel teeth on the flanges 25 and 30 have separated sufficiently to clear each other. Thus, the turret 21 may be rotated on stud 18. Rotary movement of the cam 34 in the opposite direction will cause the contour surfaces 36 on cam 34 to force the rolls 37 and shoes 38 radially outwardly. Since there is some clearance between the stud 18 and turret 21, and there is a common cone center for the teeth on face gears 23 and 28, as the shoes 38 move radially outwardly, the turret 21 is automatically centered independently of the stud 18. Furthermore, since there are so many bevel gear teeth about such a large circle (substantially the inscribed circle of the polygonal-faced turret 21), there is provided a means for accurately centering the turret 21 simultaneously at every point about the gears 23 and 28 where a tooth is located. Furthermore, due to the slight bevel of the teeth of gears 23 and 28, the turret locking force is distributed over the entire flanks of all of the bevel gear teeth. Since the segmental shoes 38 form a large diameter ring which is substantially a continuous circle, the clamping force is distributed over a large area, thereby reducing the unit pressure required to provide adequate clamping, and such clamping forces do not place the stud 18 in tension.

Referring to FIG. 2, in order to oscillate the cam 34, a connecting rod 48 having its one end pivotally connected to the cam 34 by a pin 49 is provided with its opposite end pivotally connected to a piston rod 50 by a pin 51. The piston rod 50 may extend into a cylinder 52 mounted on the saddle 10. As will appear later, the hydraulic fluid employed to actuate the piston rod 50 may also be employed to rotate a hydraulic torque motor 53, to the output shaft 54 of which a worm 55 is fixed. The worm 55 may mesh with a worm wheel 56 that acts through a further gear reduction to a pinion 57. The pinion 57 may be in mesh with spur gear teeth 58 formed about the periphery of face gear 28.

Referring to FIG. 1, there is provided a pin 59 exactly diametrically opposite the center of the tool receiving means on each face of the turret 21. Pins 59 are adapted to cooperate with an electrical switch 60 mounted within a cored out recess 61 in the saddle 10.

Referring to FIG. 3, the normally closed switch 60 is in series with a capacitor 62 leading to ground. This condition of switch 60 causes capacitor 62 to be charged. Each time a pin 59 moves switch 60 from its normally closed to its normally open position, the capacitor 62 discharges through a solenoid 63 that indexes a stepping relay 64 from one position to another position. The stepping relay 64 may include an electrical conducting disc 65, normally making contact with four of five contacts, the fifth contact being open by virtue of a notch 66 in the disc 65. The five contacts of the stepping relay 64 may be connected to separate manually operable push button switches 67, 68, 69, 70 and 71, all of which are also connected to a source of power. The push button switches 67 to 71 are of such construction that upon closing any one of them, all others open, and the one closed remains closed until the actuation of another when it opens.

The conducting disc 65 may be electrically connected to a solenoid 72 that is adapted to actuate a relay including contacts 73 and 74. Normally, contacts 73 are in position to energize a solenoid 75 from a low voltage source 76. Referring to FIG. 5, energizing solenoid 75 causes pressure fluid to flow from a line 77 through a four-way valve 78, thence through a line 79 to the one side of the piston within cylinder 52, causing it to be moved in a direction to turn cam 34 (FIG. 2) in a direction to lock turret 21 to the saddle 10. Fluid from line 79 cannot flow through hydraulic motor 53 because of a check valve 80.

In the condition shown in FIG. 3, switch 69 has been actuated and the turret 21 is in the position corresponding to switch 69. Closing switch 71 would cause opening of switch 69 as previously described. This would cause current to flow from the low voltage source through switch 71 to disc 65, thence through solenoid 72 to ground. Accordingly, solenoid 72 is energized, moving contacts 73 and 74 to their dotted line positions. This causes de-energization of solenoid 75 and energizing of a solenoid 81 which causes four-way valve 78 to move from its position in FIG. 5 to the position shown in FIG. 4. In the position of valve 78 as shown in FIG. 4, liquid from line 77 passes through a line 82, thence to cylinder 52 and motor 53 past check valve 80. With the turret locked to saddle 10, motor 53 will not function. However, the pressure liquid from line 82 moves the piston within cylinder 52 in a direction to rotate cam 34 in a direction to unlock the turret 21 from saddle 10 and immediately motor 53 begins to rotate, thereby indexing turret 21. Each time a pin 59 on turret 21 contacts switch 60, capacitor 62 is discharged through solenoid 63, causing stepping relay 64 to index to its next succeeding position. This will continue, of course, until the notch 66 arrives at the contact corresponding to switch 71 when solenoid 72 is de-energized, causing the contacts 73 and 74 to return to the position shown in solid lines (FIG. 3). Accordingly, solenoid 81 is de-energized and solenoid 75 is energized. Energizing solenoid 75 causes valve 78 to move to the position shown in FIG. 5, whereupon the flow of liquid through it is reversed. However, the hydraulic motor 53 does not reverse its rotation since the check valve 80 prevents flow of liquid through it. The piston within cylinder 52, however, is moved in a direction to lock the turret 21 to the saddle 10, where it will remain until another of the buttons 67 to 71 is pressed.

Although the various features of the new and improved power operated turret have been shown and described in detail to fully disclose one embodiment of the invention, it will be evident that changes may be made in such details and certain features may be used without others without departing from the principles of the invention.

What is claimed is:

1. In a machine tool, a saddle; a non-rotatable stud fixed to said saddle; a polygonally faced tool-supporting turret mounted on said stud for free rotary movement; and means for locking said turret to, and for unlocking it from said saddle, said means including automatic turret centering means that is independent of said turret-supporting stud and which comprises intermeshable bevel face gear teeth.

2. In a machine tool, a saddle; a non-rotatable stud fixed to said saddle; a polygonally faced tool-supporting turret mounted on said stud for free rotary movement; and means for locking said turret to, and for unlocking it from said saddle, said means being arranged about a circle having a diameter equal to substantially that of the inscribed circle of said polygonally faced turret and comprising intermeshable bevel face gear teeth.

3. In a machine tool, a saddle; a non-rotatable stud fixed to said saddle; a polygonally faced tool-supporting turret mounted on said stud for free rotary movement; means for locking said turret to, and for unlocking it from said saddle, said means including radially movable means; and oscillatable cam means for operating said radially movable means.

4. In a machine tool, a saddle; a polygonally faced tool-supporting turret mounted on said saddle for free rotary movement; and cam operated means for locking said turret to, and for unlocking it from said saddle, said means including automatic turret centering means that is independent of said turret support mounting and comprising intermeshable bevel face gear teeth.

5. In a machine tool, a saddle; a polygonally faced tool-supporting turret mounted on said saddle for free rotary movement; means for locking said turret to, and for unlocking it from said saddle, said means being arranged about a circle having a diameter equal to substantially that of the inscribed circle of said polygonally faced turret; and radially movable means for rendering effective said locking and unlocking means.

6. In a machine tool, a saddle; a polygonally faced tool-supporting turret mounted on said saddle for free rotation; means between the back face of said turret and said saddle, said means being adapted to intermesh; radially movable means for effecting the intermeshing and separation of said intermeshable means; and oscillatable cam means for operating said radially movable means.

7. In a machine tool, a saddle; a non-rotatable stud fixed to said saddle; a polygonally faced tool-supporting turret mounted on said stud for free rotation; means between the back face of said turret and said saddle, said means being adapted to intermesh; radially movable means for effecting the intermeshing and separation of said intermeshable means; oscillatable cam means including contour surfaces on its periphery; rolls between said surfaces and said radially movable means; and means for oscillating said cam means.

8. In a machine tool, a saddle; a non-rotatable stud fixed to said saddle; a polygonally faced tool-supporting turret mounted on said stud for free rotation; means between the back face of said turret and said saddle, said means being adapted to intermesh; radially movable means for effecting the intermeshing and separation of said intermeshable means; oscillatable cam means including a plurality of contour surfaces peripherally arranged about said cam means, each surface including a spiral portion and a cylindrical portion; rolls between said surfaces and said radially movable means; and means for oscillating said cam means.

9. In a machine tool, a saddle; a non-rotatable stud fixed to said saddle; a polygonally faced tool-supporting turret mounted on said stud for free rotary movement; a bevel face gear fixed to said saddle and surrounding said stud; another bevel face gear fixed to the back face of said turret in position to cooperate with said first-mentioned face gear; radial, inwardly converging surfaces on said face gears; oscillatable cam means on said stud; segmental shoes between said cam means and said inwardly converging surfaces, said shoes including radial, outwardly diverging surfaces adapted to cooperate with the inwardly converging surfaces on said face gears; roller means between said shoes and cam means; contour surfaces on said cam means adapted to cooperate with said roller means for radially moving said shoes into and out of cooperating position with said face gears when said cam means is oscillated; and means for oscillating said cam means.

10. In a machine tool, a saddle; a non-rotatable stud fixed to said saddle; a polygonally faced tool-supporting turret mounted on said stud for free rotary movement; a bevel face gear fixed to said saddle and surrounding said stud; another bevel face gear fixed to the back face of said turret in position to cooperate with said first-mentioned face gear; radial, inwardly converging surfaces on said face gears; oscillatable cam means on said stud; segmental shoes between said cam means and said inwardly converging surfaces, said shoes including radial, outwardly diverging surfaces adapted to cooperate with the inwardly converging surfaces on said face gears; contour surfaces on said cam means for radially moving said shoes into and out of cooperating position with said face gears when said cam means is oscillated; rolls between said contour surfaces and said shoes; and means for oscillating said cam means.

11. In a machine tool, a saddle; a non-rotatable stud fixed to said saddle; a polygonally faced tool-supporting turret mounted on said stud for free rotary movement; a bevel face gear fixed to said saddle and surrounding said stud; another bevel face gear fixed to the back face of said turret in position to cooperate with said first-mentioned face gear; radial, inwardly converging surfaces on said face gears; oscillatable cam means on said stud; segmental shoes between said cam means and said inwardly converging surfaces, said shoes including radial, outwardly diverging surfaces adapted to cooperate with the inwardly converging surfaces on said face gears; contour surfaces on said cam means for radially moving said shoes into and out of cooperating position with said face gears when said cam means is oscillated, said contour surfaces including spiral-like portions and cylindrical portions; rolls between said contour surfaces and said shoes; and means for oscillating said cam means.

12. In a machine tool, a saddle; a non-rotatable stud fixed to said saddle; a polygonally faced tool-supporting turret mounted on said stud for free rotary movement; means normally urging said turret along said stud away from said saddle; a bevel face gear fixed to said saddle and surrounding said stud; another bevel face gear fixed to the back face of said turret in position to cooperate with said first-mentioned face gear; radial, inwardly converging surfaces on said face gears; oscillatable cam means on said stud; segmental shoes between said cam means and said inwardly converging surfaces, said shoes including radial, outwardly diverging surfaces adapted to cooperate with the inwardly converging surfaces on said face gears; roller means between said shoes and cam means; contour surfaces on said cam means adapted to cooperate with said roller means for radially moving said shoes into and out of cooperating position with said face gears when said cam means is oscillated; and means for oscillating said cam means.

13. In a machine tool, a saddle; a non-rotatable stud fixed to said saddle; a polygonally faced tool-supporting turret mounted on said stud for free rotary movement; a bevel face gear fixed to said saddle and surrounding said stud; another bevel face gear fixed to the back face of said turret in position to cooperate with said first-mentioned face gear; radial, inwardly converging surfaces on said face gears; oscillatable cam means on said stud; segmental shoes between said cam means and said inwardly converging surfaces; said shoes including radial, outwardly diverging surfaces adapted to cooperate with the inwardly converging surfaces on said face gears; roller means between said shoes and cam means; contour surfaces on said cam means adapted to cooperate with said roller means for radially moving said shoes into and out of cooperating position with said face gears when said cam means is oscillated; means for oscillating said cam means; a rotatable motor means; a gear train between said motor means and the face gear fixed to said turret; and common means for oscillating said cam and for rotating said rotatable means.

14. In a machine tool, a saddle; a non-rotatable stud fixed to said saddle; a polygonally faced tool-supporting turret mounted on said stud for free rotary movement; a bevel face gear fixed to said saddle and surrounding said stud; another bevel face gear fixed to the back face of said turret in position to cooperate with said first-mentioned face gear; radial, inwardly converging surfaces on said face gears; oscillatable cam means on said stud; segmental shoes between said cam means and said inwardly converging surfaces, said shoes including radial, outwardly diverging surfaces adapted to cooperate with the inwardly converging surfaces on said face gears; roller means between said shoes and cam means; contour surfaces on said cam means adapted to cooperate with said roller means for radially moving said shoes into and out of cooperating position with said face gears when said cam means is oscillated; means for oscillating said cam means; hydraulic means for rotating said turret; hydraulic means for oscillating said cam means; and means common to both of said hydraulic means for suppling liquid thereto.

15. In a machine tool, a saddle; a non-rotatable stud fixed to said saddle; a polygonally faced tool-supporting turret mounted on said stud for free rotary movement; a bevel face gear fixed to said saddle and surrounding said stud; another bevel face gear fixed to the back face of said turret in position to cooperate with said first-mentioned face gear; internal flanges on both of said face gears and having tapered cam surfaces thereon; an oscillatable cam journaled on said stud and having peripherally arranged contour surfaces; rolls adapted to cooperate with said contour surfaces; radially movable clamping shoes held in contact with said rolls, said shoes having cam surfaces adapted to cooperate with the cam surfaces on the internal flanges of said face gears, said shoes in their one radial position forcing the teeth of said bevel face gears into meshing relation, and in their other radial position to provide clearance between the tips of the gear teeth; a gear drive between the face gear attached to said turret and a hydraulic motor means; a hydraulic piston and cylinder means for oscillating said cam; and means common to both said hydraulic means for supplying operating fluid thereto.

16. In a machine tool having a saddle, a non-rotatable stud fixed to said saddle; a polygonally faced tool-supporting turret mounted on said stud for free rotation; means for locking said turret to, and for unlocking it from said saddle, said means including automatic turret centering means that is independent of said turret supporting stud; closed circuit, hydraulically operable, electrically controlled means for rotating said turret and for actuating said locking and unlocking means; separate, manually operable means for each turret face adapted when actuated to cause said locking means to be unlocked and said turret to be rotated; and means for each turret face, adapted to reverse the flow of fluid in said hydraulically operable means only when the turret face corresponding to the actuated manually operable means is in a predetermined position.

17. In a machine tool having a saddle, a non-rotatable stud fixed to said saddle; a polygonally faced tool-supporting turret mounted on said stud for free rotation; cam operated means for locking said turret to, and for unlocking it from said saddle, said means including automatic turret centering means that is independent of said turret supporting stud; closed circuit, hydraulically operable, electrically controlled means for rotating said turret and for actuating said locking and unlocking means; separate, manually operable means for each turret face adapted when actuated to cause said locking means to be unlocked and said turret to be rotated; and means for each turret face, adapted to reverse the flow of fluid in said hydraulically operable means only when the turret face corresponding to the actuated manually operable means is in a predetermined position.

18. In a machine tool having a saddle, a non-rotatable stud fixed to said saddle; a polygonally faced tool-supporting turret mounted on said stud for free rotation; means for locking said turret to, and for unlocking it from said saddle, said means being arranged about a circle having a diameter equal substantially to that of the inscribed circle of said polygonally faced turret; closed circuit, hydraulically operable, electrically controlled means for rotating said turret and for actuating said locking and unlocking means; separate, manually operable means for each turret face adapted when actuated to cause said locking means to be unlocked and said turret to be rotated; and means for each turret face, adapted to reverse the flow of fluid in said hydraulically operable means only when the turret face corresponding to the actuated manually operable means is in a predetermined position.

19. In a machine tool having a saddle, a non-rotatable stud fixed to said saddle; a polygonally faced tool-supporting turret mounted on said stud for free rotation; means for locking said turret to, and for unlocking it from said saddle, said means including radially movable means; oscillatable cam means for operating said radially movable means; closed circuit, hydraulically operable, electrically controlled means for rotating said turret and for actuating said locking and unlocking means; separate, manually operable means for each turret face adapted when actuated to cause said locking means to be unlocked and said turret to be rotated; and means for each turret face, adapted to reverse the flow of fluid in said hydraulically operable means only when the turret face corresponding to the actuated manually operable means is in a predetermined position.

References Cited in the file of this patent

UNITED STATES PATENTS

| | | |
|---|---|---|
| 838,024 | Hendricks | Dec. 11, 1906 |
| 1,345,770 | Head | July 6, 1920 |
| 1,690,568 | Bullard | Nov. 6, 1928 |
| 2,629,163 | Makant et al. | Feb. 24, 1953 |
| 2,702,609 | Frazier et al. | Feb. 22, 1955 |
| 2,791,297 | Forbush | May 7, 1957 |
| 2,859,839 | Throne et al. | Nov. 11, 1958 |
| 2,874,595 | Foster | Feb. 24, 1959 |
| 2,887,904 | Creed | May 26, 1959 |
| 2,888,843 | Hollis | June 2, 1959 |